United States Patent [19]

Motoda et al.

[11] Patent Number: 5,106,255
[45] Date of Patent: Apr. 21, 1992

[54] POSTURE ADJUSTING MECHANISM OF CARGO HANDLING DEVICE FOR USE IN CARGO TRUCKS

[75] Inventors: Kenro Motoda; Hirosuke Isoe, both of Tokyo, Japan

[73] Assignee: Motoda Electronics Co., Ltd., Tokyo, Japan

[21] Appl. No.: 592,966

[22] Filed: Oct. 4, 1990

[51] Int. Cl.⁵ .................................................. B60P 1/54
[52] U.S. Cl. .................................... 414/540; 33/366; 212/154; 212/238; 340/685; 340/689; 414/744.5
[58] Field of Search ......................... 414/540–543, 414/546, 550, 555, 547, 744.5; 901/14; 212/154, 232, 238, 244, 254, 261; 340/685, 689; 33/366, 392, 397

[56] References Cited

U.S. PATENT DOCUMENTS

| | | | |
|---|---|---|---|
| 2,754,976 | 7/1956 | Bell | 212/254 |
| 3,662,907 | 5/1972 | Nakajo | 414/541 X |
| 3,848,750 | 11/1974 | Hoge | 212/154 |
| 4,241,838 | 12/1980 | Hayes | 414/541 X |
| 4,407,419 | 10/1983 | Clements | 212/232 X |
| 4,605,132 | 8/1986 | van Seumeren | 212/238 X |
| 4,627,172 | 12/1986 | Afromowitz | 33/392 X |
| 4,659,276 | 4/1987 | Billett | 414/540 X |
| 4,700,479 | 10/1987 | Saito et al. | 33/392 X |
| 4,797,033 | 1/1989 | Pollack | 33/366 X |

FOREIGN PATENT DOCUMENTS

| | | | |
|---|---|---|---|
| 3442578 | 6/1986 | Fed. Rep. of Germany | 414/540 |
| 3519299 | 12/1986 | Fed. Rep. of Germany | 414/540 |
| 1211606 | 2/1986 | U.S.S.R. | 212/154 |
| 728032 | 4/1955 | United Kingdom | 414/541 |

Primary Examiner—David A. Bucci
Attorney, Agent, or Firm—Rogers & Killeen

[57] ABSTRACT

A posture adjusting mechanism according to the present invention is used for a cargo handling device for a cargo truck in which an arm member is mounted in such a manner that it can swivel about a vertical shaft provided on an upper end portion of a pole member, such as a pole, mounted on a bed of the cargo truck upright and above a cab of the truck and in which a cargo supporting member, such as a hook, hangs from the distal end of the arm member in such a manner that it can be raised or lowered freely. The vertical shaft provided on the upper end portion of the pole member so as to swivel the arm member thereabout is made pivotal relative to a vertical axis.

6 Claims, 8 Drawing Sheets

POSTURE ADJUSTING MECHANISM OF CARGO HANDLING DEVICE FOR USE IN CARGO TRUCKS

BACKGROUND OF THE INVENTION

1. Field of the Invention

The present invention relates to a posture adjusting mechanism of a cargo handling device which is provided with an arm that can swivel on a horizontal plane and which is mainly provided on the bed of a cargo truck.

2. Description of the Related Art

Crane type cargo handling devices incorporated on the bed of a truck are known.

However, such conventional cargo handling devices have various drawbacks, so the present inventors have disclosed a cargo handing device for use in a cargo truck.

In the above cargo handling device, the rear end of a first arm member having a length smaller than the width of the front side of the cab of a cargo truck, is mounted on the upper surface of the cab through a vertical shaft in such a manner that the first arm member can swivel about the vertical shaft. A second arm member is turnably mounted on the distal end of the first arm member. A hoisting mechanism is mounted on the distal end of the second arm member to wind or unwind a rope member such as a belt which hangs from the hoisting mechanism. A cargo supporting portion is provided on the lower end of the rope member.

The present inventors have also proposed a cargo handling device for a cargo truck in which the hoisting mechanism is mounted on the rear end of the second arm member.

The latter cargo handling device exhibits excellent load balance in the lateral direction of the bed of the cargo truck. Furthermore, tilting the vertical shaft (mounting shaft), through which the rear end of the first arm member is mounted on the upper end of the pole member, in the lateral direction of the truck can be detected by an inclination sensor, and the pole member can be tilted in the lateral direction of the truck by operating a pivot mechanism provided within a pole mounting base through which the pole member is mounted on the bed upright on the basis of an inclination signal from the inclination sensor. Consequently, the mounting shaft can be maintained vertical even when the bed is tilted in the lateral direction thereof, and so-called arm flow phenomenon in which the arm members deviate in the lateral direction due to the tilting of the bed in the lateral direction can thus be prevented.

However, the latter cargo handling device also has the problem to be solved.

That is, in the latter cargo handling device, tilting of the mounting shaft caused by the tilting of the bed of the cargo truck in the lateral direction thereof can be corrected but tilting thereof caused by the tilting of the bed in the longitudinal direction thereof cannot be corrected. Consequently, the arm flow phenomenon in which the arm member with a cargo hanging therefrom deviates in the longitudinal direction of the bed due to the tilting of the bed in the longitudinal direction thereof cannot be avoided.

Particularly, flow of the arm in the longitudinal direction of the bed occurs during the cargo unloading or loading process in which tilting of the bed occurs gradually or when the cargo is loaded or unloaded from a cargo truck which is at a stop on a slope. In the latter case, the bed is tilted from the beginning of the cargo loading or unloading operation.

Furthermore, even though tilting of the mounting shaft can be corrected on the basis of the signal from the inclination sensor when the bed is tilted in the lateral direction thereof, it is troublesome to conduct correction operation during the cargo loading or unloading operation.

SUMMARY OF THE INVENTION

An object of the present invention is to provide a cargo handling device with a horizontally swivelling arm for use in a cargo truck which incorporates a posture adjusting mechanism to eliminate the above-described phenomenon or to decrease the possibility of the above-described phenomenon occurring, and which incorporates a perpendicularity sensor used for the operation of the above posture adjusting mechanism.

To this end, the present invention provides a posture adjusting mechanism of a cargo handling device for a cargo truck in which an arm member is mounted on an upper end portion of a pole member, such as a pole, mounted on a bed of the cargo truck upright and above a cab of the truck in such a manner that it can swivel about a vertical shaft and in which a cargo supporting member, such as a hook, hangs from the distal end of the arm member in such a manner that it can rise and lower freely. The vertical shaft provided on the upper end portion of the pole member so as to swivel the arm member thereabout is made pivotal relative to a vertical axis.

The present invention further provides a posture adjusting mechanism of a cargo handling device for a cargo truck which comprises: a supporting bracket provided on an upper end portion of a pole member, such as a pole, mounted on a rear bed of the cargo truck upright and above a cab, the supporting bracket extending in the longitudinal direction of the bed; a mounting member mounted on an upper surface of the bracket in such a manner that it can be tilted about axes which lie parallel to the longitudinal and lateral directions of the bed in the longitudinal and lateral directions of the bed, a rear end of an arm member from the distal end of which a rope member, such as a belt, hangs being mounted on the mounting member through a vertical swivel shaft in such a manner that the arm member can swivel; and actuators provided on the mounting member for tilting the mounting member about the horizontal axes in the longitudinal and lateral directions. The mounting member is tilted in the longitudinal and lateral directions relative to the supporting bracket by controlling the drive of the actuators.

In the posture adjusting mechanism according to the present invention, the arm member of the cargo handling device is mounted through a vertical swivel shaft on the mounting member mounted on the distal end of the supporting bracket provided on the upper end portion of the pole member in such a manner that it can tilt in the longitudinal and lateral direction of the bed. Tilting of the swivel shaft is detected by the perpendicularity sensor, and the mounting member on which the swivel shaft is mounted is tilted in the longitudinal and lateral directions of the bed relative to the supporting bracket to make the swivel shaft vertical.

Consequently, the arm member of the cargo handling device mounted on the pole member through the swivel shaft can be automatically maintained horizontal when the bed tilts in the longitudinal or lateral direction thereof.

DESCRIPTION OF THE PREFERRED EMBODIMENTS

Figure 1:
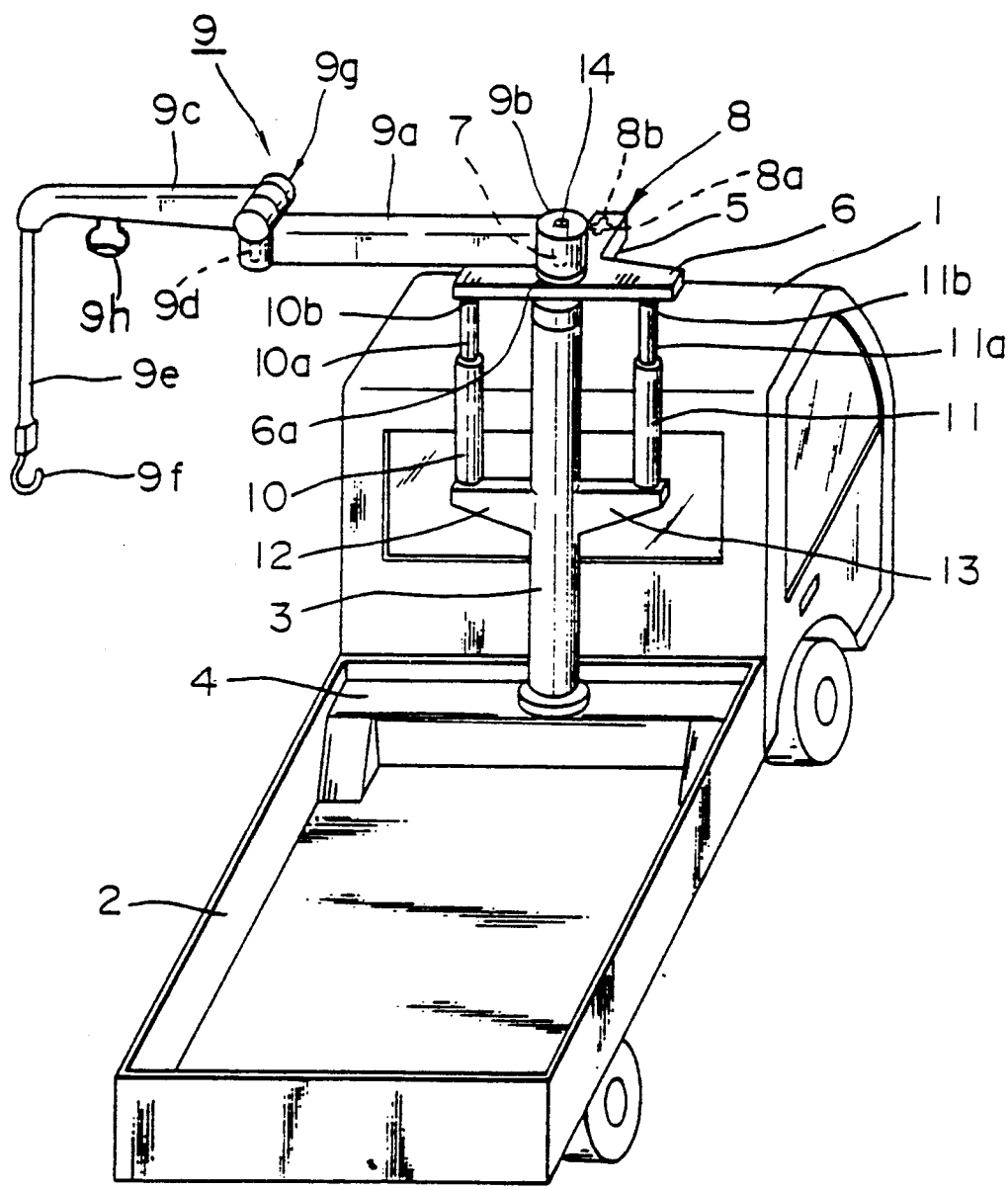
FIG. 1 is a perspective view of a cargo truck on which a cargo handling device provided with an embodiment of a posture adjusting mechanism according to the present invention is mounted.

Embodiments of the present invention will now be described with reference to the accompanying drawings.

First, a first embodiment of the present invention will be described below with reference to FIGS. 1 to 6.

In FIGS. 1 to 5, a reference numeral 1 denotes a cab for a cargo truck; 2, a box-shaped bed provided at the rear of the cab 1; and 3, a pole member, such as a pole, made of a pipe material.

The pole member 3 is mounted upright on a pole member mounting base 4 which is in turn placed on the bed 2. The pole member 3 is located at the rear of the cab 1 substantially at the midpoint of the width thereof. The pole member 3 may have a telescope structure so that it can freely expand or contract and thereby change its height.

A support bracket 5 extends from the upper end of the pole member 3 to above the cab 1. A distal end portion of a mounting member 6, made of a steel plate having an appropriate thickness and substantially having a T shaped form, is coupled to the distal end portion of the support bracket 5 by means of, for example, a universal joint which allows the mounting member 6 to tilt relative to the support bracket 5 in the longitudinal and lateral directions of the truck.

A swivel shaft 7 is mounted in a vertical direction on the upper surface of the mounting member 6 at a central portion 6a of a proximal portion thereof. A rear end portion of a first arm member 9a of a cargo handling device 9, which will be described later, is mounted on the swivel shaft 7.

The cargo handling device 9 is of the type whose arm swivels on a plane. The first arm member 9a of the cargo handling device 9 has at its rear end a hinge 9b by means of which the first arm member 9a is mounted on the vertical swivel shaft 7 in such a manner that it can swivel. A second arm member 9c of the cargo handling device 9 is coupled to the distal end of the first arm member 9a through a vertical shaft 9d.

A belt 9e hangs from the distal end of the second arm member 9c, and a hook 9f which serves as a cargo supporting member is provided at the lower end of the belt 9e. A hoisting mechanism 9g is provided at the rear end of the second arm member 9c to wind or unwind the belt 9e. The hoisting mechanism 9g may be composed of a motor, a reduction gear and a hoisting drum.

The cargo handling device 9 has two arm members 9a and 9c. However, it may have one or three or more arm members. Furthermore, the arm member may have a telescope structure which allows it to expand and contract freely. The arm member capable of expanding and contracting is convenient for handling cargos because it can expand or contract the range in which the cargos can be moved on a plane freely within its expanding and contracting range.

Thus, the mounting member 6 can be tilted in the longitudinal and lateral directions of the truck by the action of the universal joint 8 provided on the distal end portion of the support bracket 5, and the swivel shaft 7 can thus be tilted in the longitudinal and lateral directions of the truck relative to the vertical axis. This allows the position of the cargo handling device 9 to be freely adjusted. This means that tilting of the cargo handling device 9, which occurs when the bed 2 is tilted in the longitudinal or lateral direction and the pole member 3 is thereby titled in that direction from the vertical axis, can be prevented by maintaining the mounting member 6 in a horizontal position and thereby maintaining and adjusting the swivel shaft 7 in a vertical position.

The adjusting mechanism of the present invention is based on the above-described concept. The components of the adjusting mechanism will now be described with reference to FIGS. 2 to 5.

The lower end portions of cylinders 10 and 11 whose rods 10a and 11a are moved back and forth in the cylinders are respectively mounted on supporting members 12 and 13 which extend from the intermediate portion of the pole member 3 rightward and leftward. The distal ends of the rods 10a and 11a are mounted on the under surface of the right and left portions of the proximal end portion of the mounting member 6 through swivel joints 10b and 11b. Reference numerals 10c and 11c respectively denote motors; 10d and 11d, feed screws; and 10e and 11e, nut portions of the rods.

Thus, the mounting member 6 can be pivoted in the longitudinal direction of the truck about a horizontal axis 8a of the universal joint 8 which lies in the lateral direction of the truck by simultaneously raising the rods 10a and 11a of the motor cylinders 10 and 11 through the same distance. Also, the mounting member 6 can be pivoted in the lateral direction of the truck around a horizontal axis 8b of the universal joint 8 which lies in the longitudinal direction of the truck relative to the pole member 3 by respectively raising and lowering or lowering and raising the rods 10a and 11a.

A rotational actuator such as a motor (not shown) may be employed in place of the motor cylinders 10 and 11 to directly rotate the axes 8a and 8b of the universal joint 8.

Thus, in the present invention, the perpendicularity of the swivel shaft 7 is adjusted by titling the mounting member 6 in the longitudinal and lateral directions of the bed 2.

The perpendicularity of the swivel shaft 7 is measured by a perpendicularity sensor 14 provided coaxially with respect to the shaft 7. The motor cylinders 10 and 11 are controlled in accordance with the output of the sensor 14.

Figure 4:
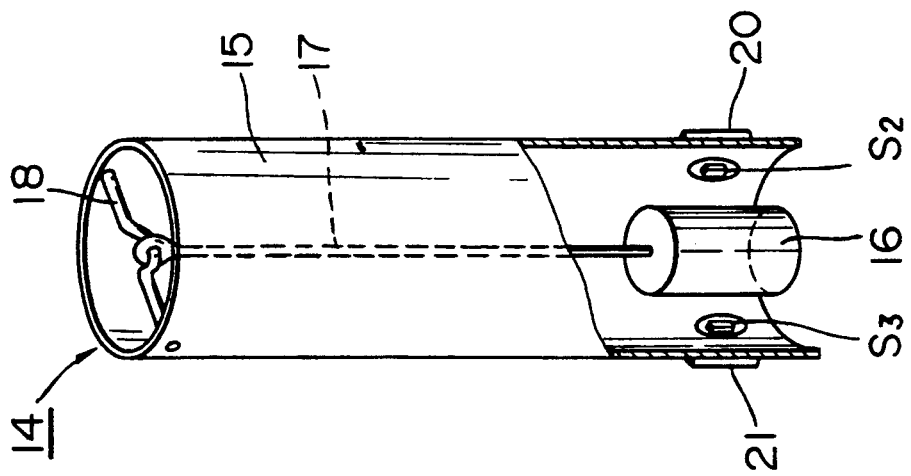
FIG. 4 is a perspective view, with parts broken away, of an example of a perpendicularity sensor employed in the adjusting mechanism according to the present invention.

Turning to FIG. 4, the perpendicularity sensor 14 is mounted coaxially on the swivel shaft 7 provided on the mounting member 6 at the central portion of the proximal portion thereof. However, the perpendicularity sensor 14 may be mounted on any position where it can be tilted together with the mounting member 6.

The perpendicularity sensor 14 includes a cylindrical housing 15, a columnar weight 16 which hangs from the center of the upper end of the cylindrical housing 15 by means of a supporting rod 17, and a supporting bar 18 for retaining the upper end portion of the supporting rod 17 at the center of the upper end of the cylindrical housing 15. A left contact switch 19, a right contact switch 20, a front contact switch 21 and a rear contact switch 22 are mounted on the lower end portion of the cylindrical housing 15.

Contact surfaces S1, S2, S3 and S4 of the contact switches 19 to 22 protrude from the inner peripheral surface of the cylindrical housing 15 inwardly by a distance which allows them to be separated from the side surface of the weight 16 by a distance from 1 mm to 3 mm when the cylindrical housing 15 is vertical. Thus, when the cylindrical housing 15 tilts in the longitudinal or lateral direction of the truck, the side surface of the weight 16 makes contact with either of the contact surfaces S1, S2, S3 and S4, and thereby makes the corresponding contact switch operated to generate an inclination signal.

Hence, the direction in which the mounting member 6 is tilted can be reliably detected by the perpendicularity sensor 14.

The mounting member 6 is mounted on the support bracket 5 by means of the universal joint 8 in such a manner that it can tilt in the longitudinal and lateral directions of the truck relative to the upper end of the pole member 3. Also, the left and right end portions of the mounting member 6 are respectively mounted on the rods 10a and 11a of the motor cylinders 10 and 11. Therefore, tilting of the mounting member 6 in longitudinal or lateral direction or in a combined direction can be corrected to make the mounting member 6 horizontal and thereby make the swivel shaft 7 vertical by controlling the operation of the motor cylinders 10 and 11 on the basis of the inclination signal from the perpendicularity sensor 14.

As a result, the swivel shaft 7 mounted on the mounting member 6 upright can be maintained vertical, and tilting of the arm members 9a and 9c of the cargo handling device 9 from their horizontal position can thus be prevented.

In this embodiment, the contact switches 19 to 22 are used to detect inclination. However, optical sensors which utilize light to output a signal or magnetic sensors which utilize a magnetic field to output a signal may also be used in place of the contact switches.

Figure 6:
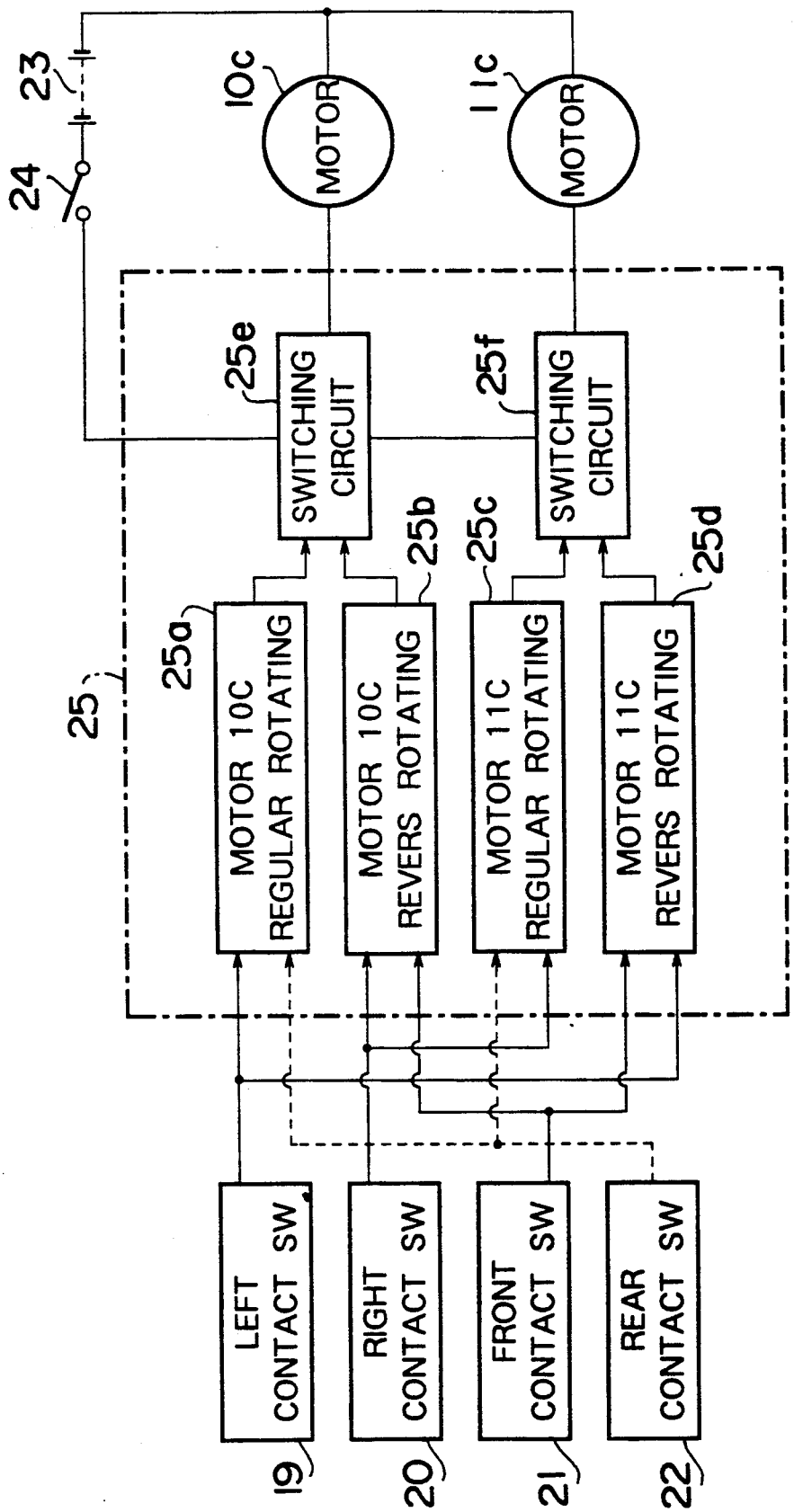
FIG. 6 is a block diagram of an example of a power source circuit employed in the adjusting mechanism according to the present invention.

FIG. 6 is a block diagram of a power source circuit of the adjusting mechanism according to the present invention, showing the connection between the motors 10c and 11c of the motor cylinders 10 and 11, the contact switches 19 to 22 mounted on the perpendicularity sensor 14, a vehicle-mounted battery 23 and a control circuit including a switch 24. In FIG. 6, a reference numeral 25a denotes a circuit of rotating the motor 10c in a normal direction; 25b, a circuit of rotating the motor 10c in a reverse direction; 25c, a circuit of rotating the motor 11c in a normal direction; 25d, a circuit of rotating the motor 11c in a reverse direction; and 25e and 25f, switch-over circuits.

The motors 10c and 11c are rotated in two different directions when the left or right contact switch 19 or 20 is operated, in a reverse direction (in which the rods 10a and 11a of the cylinders are retracted) when the switch 21 is operated, and in a normal direction (in which the rods 10a and 11a advance) when the switch 22 is operated.

When the bed 2 is tilted in a direction in which the longitudinal and lateral directions are combined and the two adjacent switches of the switches 19 to 22 are operated at the same time, the outputs of these switches are processed in a predetermined order and are utilized for the rotation of the motors 10c and 11c.

A power switch 24 is kept off while the cargo handling device 9 is not being used. The motor for the hoisting mechanism 9g of the cargo handling device 9 is also driven by the vehicle-mounted battery 23. However, it may be driven by another power source. Furthermore, an illumination 9h (shown in FIG. 1), which is driven by the battery 23, may be provided on the distal end of the arm member 9c to illuminate the supporting member (hook) 9f during the cargo handling operation conducted at nights.

Figure 3:
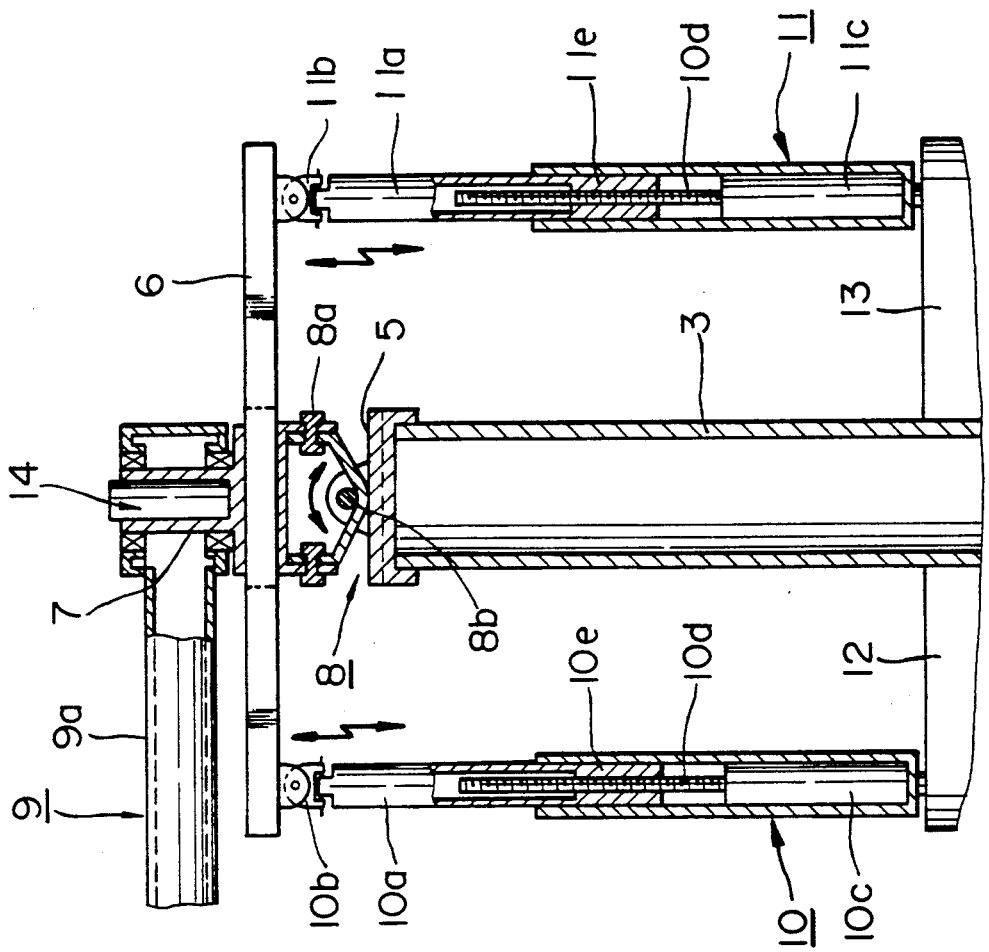
FIG. 3 is a front view, with parts broken away, of the essential parts of the adjusting mechanism according to the present invention.
Figure 2:
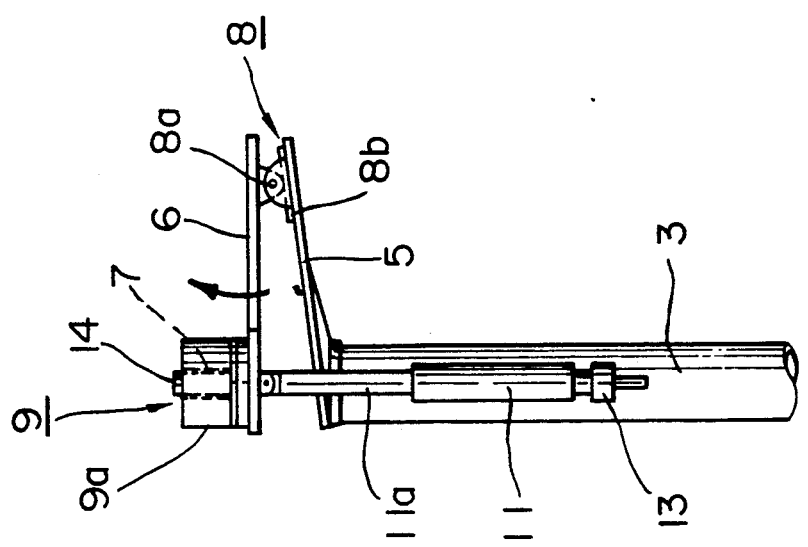
FIG. 2 is a side view of the upper portion of the cargo handling device of FIG. 1.

The tilting mechanism which maintains the swivel shaft 7 vertical may have any of the structures shown in FIGS. 7 to 12, in addition to that shown in FIGS. 1 to 3.

Figure 7:
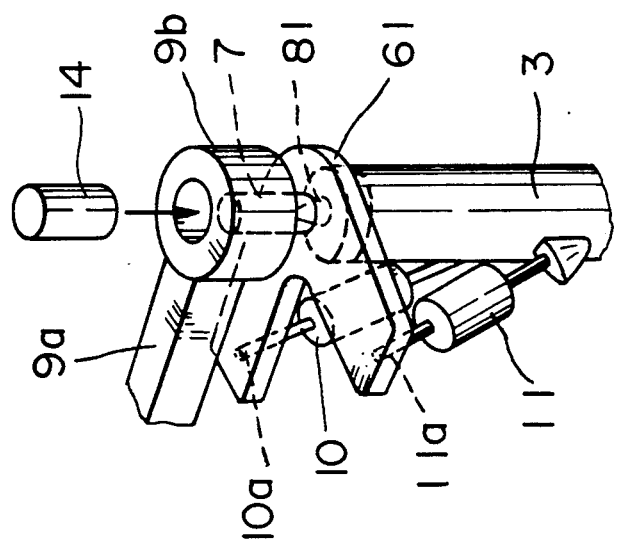
FIG. 7 is a perspective view of another example of a tilting mechanism employed in the adjusting mechanism according to the present invention.
Figure 5:
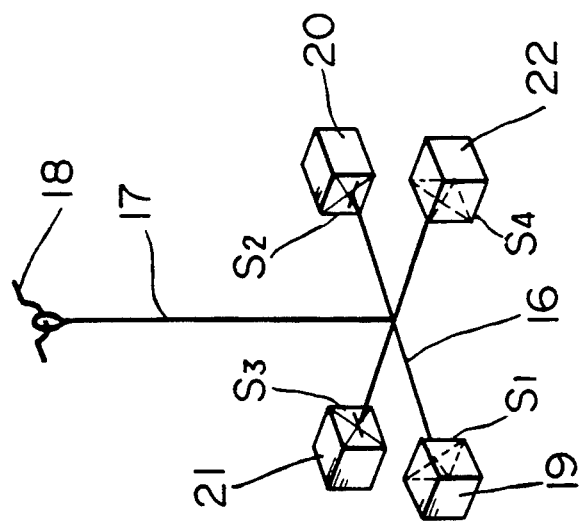
FIG. 5 is a perspective view, showing the relation between a weight and sensors in the perpendicularity sensor.
Figure 8:
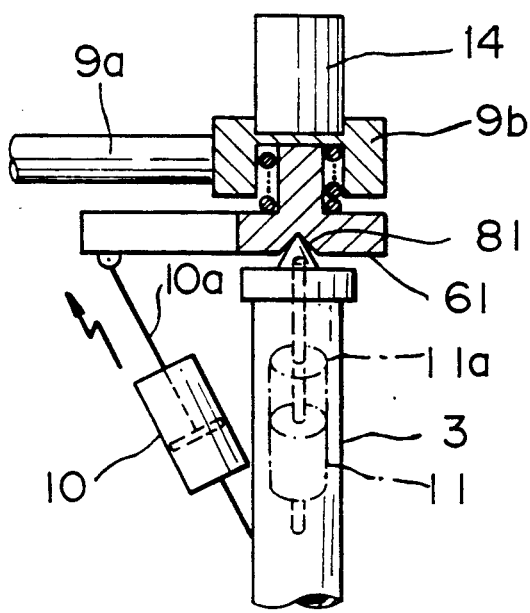
FIG. 8 is a front and cross-sectional view of the tilting mechanism of FIG. 7.

In the mechanism shown in FIGS. 7 and 8, a flat mounting member 61 having a substantially V shaped form is mounted on an upward pivot 81 provided on the upper end of the pole member 3 in such a manner that it can pivot in any direction, and stroke actuators 10 and 11 are provided between the distal end portions of the mounting member 61 and the pole member 3. Tilting of the swivel shaft 7 relative to the vertical axis can be adjusted by advancing or retracting the rods 10a and 11a of the actuators 10 and 11. In FIGS. 7 and 8, the same reference numerals are used to denote parts which are the same as those of FIGS. 1 to 3.

Figure 9:
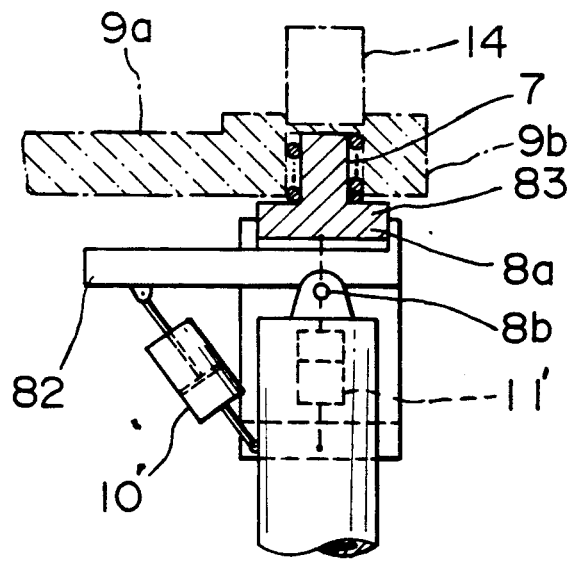
FIG. 9 is a front and cross-sectional view of another example of the tilting mechanism.
Figure 11:
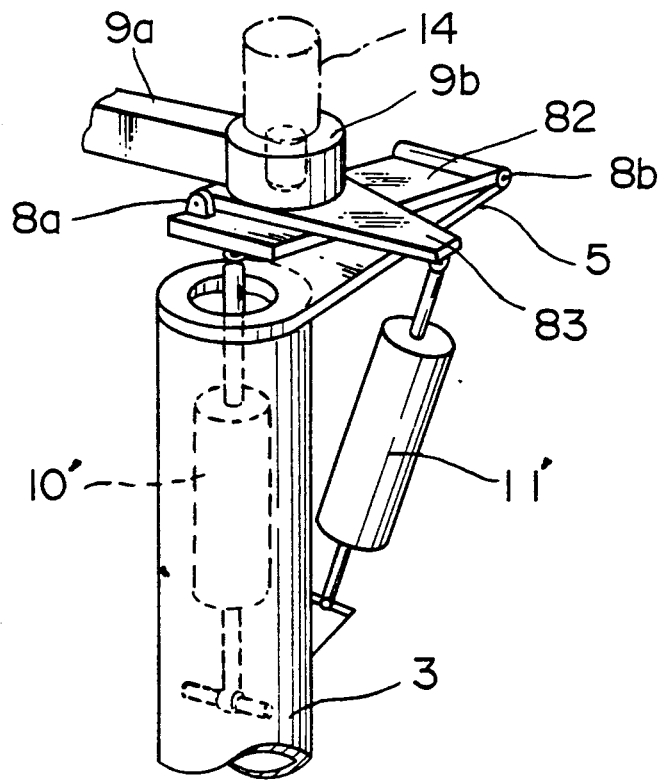
FIG. 11 is a perspective view of another example of the tilting mechanism.

In the mechanism shown in FIG. 9, two plate-like members 82 and 83 are used in place of the flat mounting member having a V shaped-form which is employed in the mechanism shown in FIGS. 7 and 8. The plate-like members 82 and 83 are coupled to the upper end of the pole member 3 through horizontal axes 8a and 8b. The plate-like member 82 is pivoted about the axis 8b relative to the pole member 3 by an actuator 10', and the plate-like member 83 is pivoted about the axis 8a relative to the plate-like member 82 by an actuator 11'. The mechanism shown in FIG. 9 may be replaced by a mechanism shown in FIG. 11. In FIGS. 9 and 11, the same reference numerals are used to denote parts which are the same as those of FIGS. 1 to 3.

Figure 10:
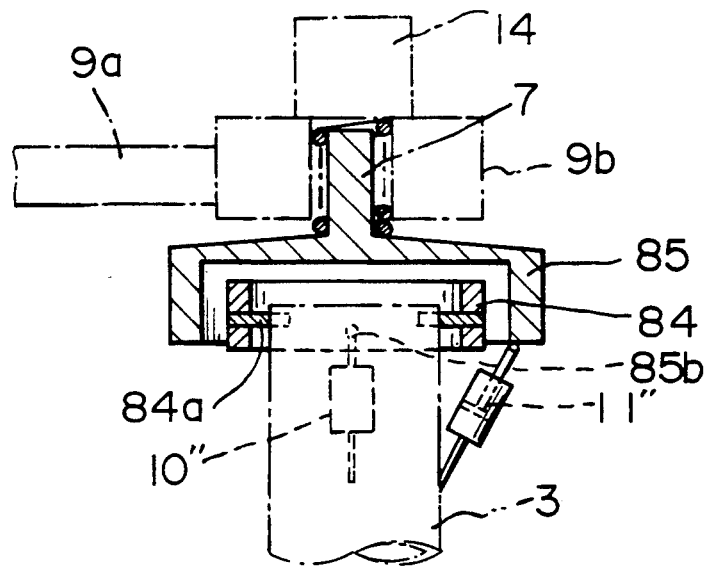
FIG. 10 is a front and cross-sectional view of another example of the tilting mechanism.

In the mechanism shown in FIG. 10, two annular or ring-like mounting members 84 and 85 are loosely fitted onto the upper end of the pole member 3. The ring-like mounting member 84 is made pivotal about an axis 84a relative to the pole member 3, and the ring-like mounting member 85 is made pivotal about an axis 85b (extending generally perpendicular to the drawing sheet) relative to the ring-like member 84. Tilting of the swivel shaft 7 provided on the upper surface of the ring-like mounting member 85 relative to the vertical axis can be adjusted by separately oscillating the ring-like members 84 and 85 about the axes 84a and 85b by an actuator 10" provided between the ring-like member 84 and the pole member 3 and an actuator 11" provided between the ring-like member 85 and the pole member 3, respectively.

In the tilting mechanisms shown in FIGS. 9 and 10, the axes 8a, 8b, 84a and 85b may be directly rotated by the output of an actuator such as a motor which replaces the actuators 10', 10", 11' and 11".

Figure 12:
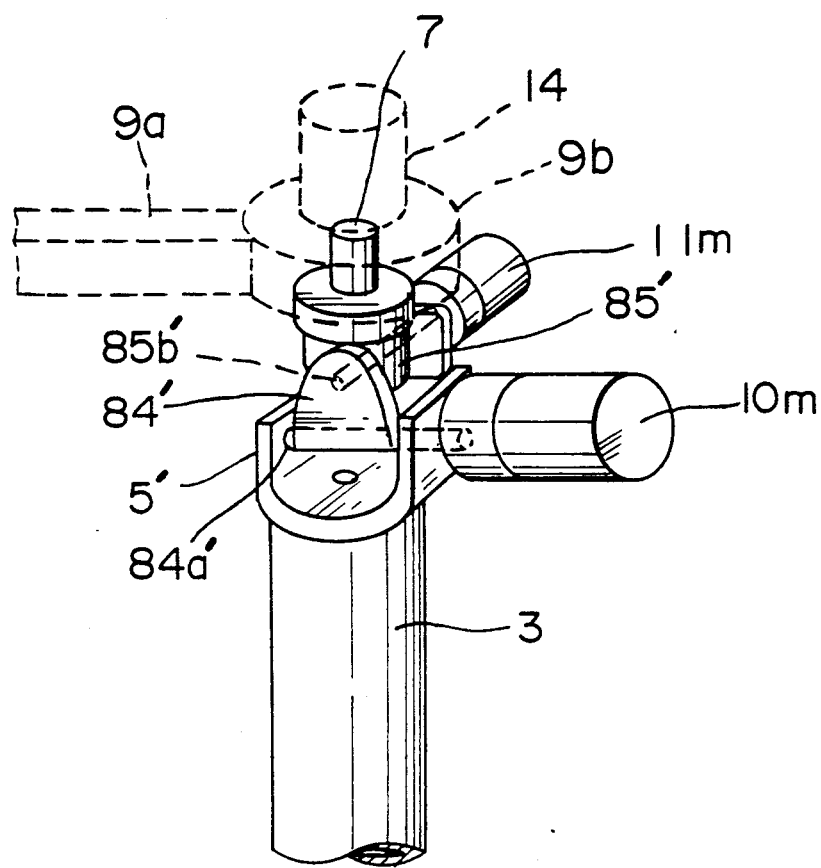
FIG. 12 is a perspective view of another example of the tilting mechanism.

In the mechanism shown in FIG. 12, bearing-like mounting members 84' and 85' are employed in place of the ring-like mounting members 84 and 85 employed in the mechanism shown in FIG. 10. The mounting members 84' and 85' are mounted on the pole member 3 through a support bracket 5' in a state in which their axes 84a' and 85b' cross with each other. The perpendicularity of the swivel shaft 7 provided on the mounting member 85' is adjusted by respectively rotating the axes 84a' and 85b' by geared motors 10m and 11m.

Figure 13:
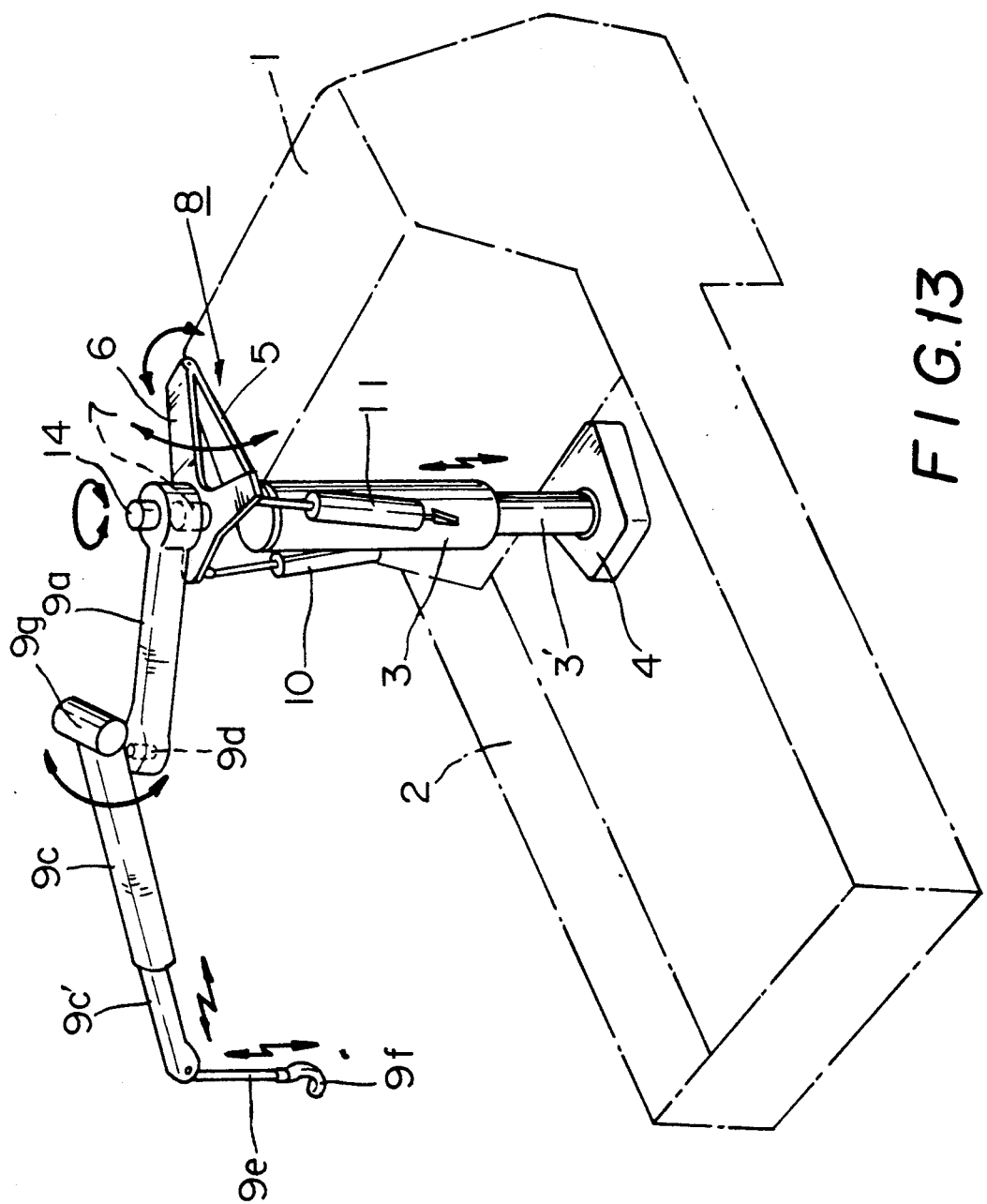
FIG. 13 is a perspective view of another example of the cargo handling device.

FIG. 13 shows another example of a cargo handling device for a cargo truck in which the adjusting mechanism according to the present invention is incorporated. In this cargo handling device, the second arm member 9c and the pole member 3 have the telescope structure and can be expanded and contracted. In FIG. 13, a reference numeral 9c' denotes an expanding/contracting arm member, and 3' denotes an expanding/contracting support portion. Other reference numerals are the same as those of the parts of FIG. 1.

As will be understood from the foregoing description, in the posture adjusting mechanism according to the present invention, tilting of the swivel shaft, on which the cargo handling device having the arm which can be swivelled freely on a plane is mounted, relative to the vertical axis is detected by the perpendicularity sensor, and the mounting member on which the swivel shaft is mounted upright is made horizontal and the swivel shaft is thereby made vertical by rotating the motors or motor cylinders or by controlling the stroke actuators on the basis of the inclination signal detected by the sensor. Consequently, swivel of the arm members of the cargo handling device can be maintained horizontal even when pitching and rolling of the bed of a cargo truck occurs, and so-called arm-flow phenomenon which would otherwise occur in any direction on the horizontal plane can thus be prevented.

Particularly, tilting of the cargo handling device can be automatically corrected by the adjusting mechanism according to the present invention. In consequence, even when imbalance of the load on the bed occurs during the loading and unloading operations, the operation of correcting the horizontal position of the cargo handling device can be eliminated. This greatly improves the operation efficiency.

What is claimed is:

1. A posture adjusting mechanism of a cargo handling device for a cargo truck, comprising:
    a supporting bracket provided on an upper end portion of a pole member mounted on a rear bed of said cargo truck upright and above a cab, said supporting bracket having a first portion fixedly extending in a longitudinal direction of said bed away from said pole member;
    a mounting member mounted on an upper surface of said first portion in such a manner that it can be tilted about two axes which lie parallel and perpendicular to the longitudinal direction, a rear end of an arm member, from a distal end of which a rope member, being mounted on said mounting member through a vertical swivel shaft in such a manner that said arm member can swivel; and
    actuators provided on said mounting member for tilting said mounting member about said two axes, wherein said mounting member is tilted relative to said supporting bracket by operation of said actuators.

2. A posture adjusting mechanism of a cargo handling device according to claim 1, wherein said arm member of said cargo handling device includes a first arm member whose rear end is mounted on said mounting member through a vertical swivel shaft, and a second arm member whose rear end is connected to a distal end of said first arm member through a vertical shaft and on the rear end of which a hoisting mechanism for a rope member hanging from a front end of said second arm member is disposed.

3. A posture adjusting mechanism of a cargo handling device according to claim 1, wherein tilting of said mounting member is controlled by a signal obtained by a perpendicularity sensor which detects a non-vertical alignment of the swivel shaft of said arm member.

4. A posture adjusting mechanism of a cargo handling device according to claim 1, wherein said arm member of said cargo handling device is provided with an illumination, said illumination being provided on the distal end of said arm member from which the rope member hangs.

5. A posture adjusting mechanism of a cargo handling device according to claim 3, wherein said perpendicularity sensor includes a hollow cylindrical member mounted on an axis parallel to the swivel shaft of said arm member mounted on said mounting member, and a weight member hanging from an upper end of said cylindrical member in such a manner that it can pivot freely at least in crossed directions, said weight member facing detection sensors, mounted on an inner surface of a lower portion of said cylindrical member at four positions.

6. A leveling apparatus for a cargo handling device for a truck comprising:
    a. a pole member that is vertical with respect to the truck;
    a support member that fixedly extends from said pole member;
    c. a T-shaped mounting member having a base portion with an end hingedly connected to said support member and a crossing portion centered a first distance above said pole member,
    said base portion being hingedly connected to said support member so as to be able to be inclined relative thereto in two perpendicular directions; and d. two actuators, each having a first end attached to said pole member and a second end attached to said crossing portion at an end thereof, said actuators for inclining said mounting member and for adjusting said first distance, whereby a cargo handling device carried by said mounting member may be made level by operation of said two actuators.

* * * * *